W. S. HADAWAY, Jr.
HEATING AND REGULATING APPARATUS.
APPLICATION FILED FEB. 20, 1913.
1,097,223.
Patented May 19, 1914.
3 SHEETS—SHEET 1.
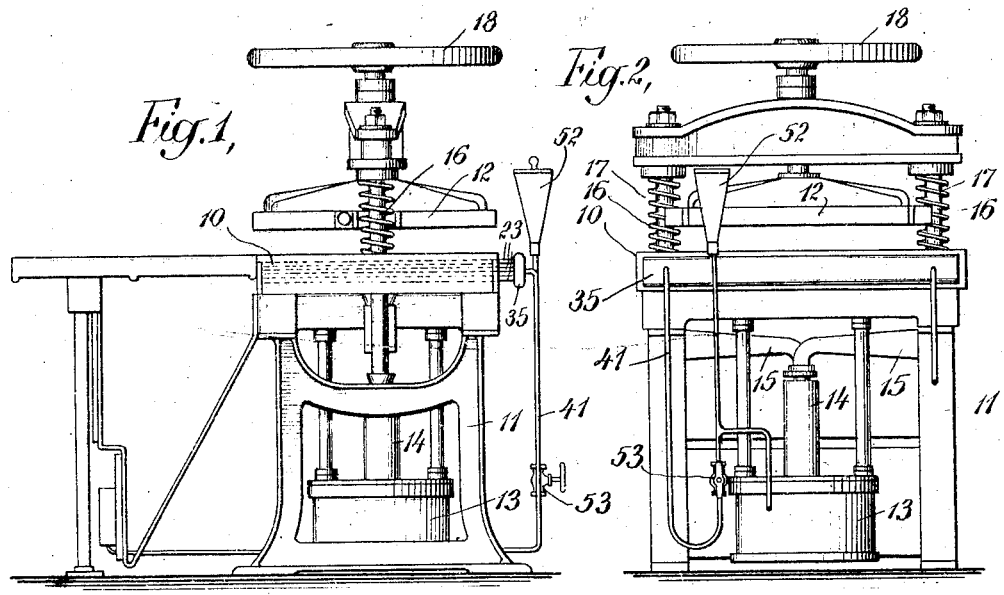
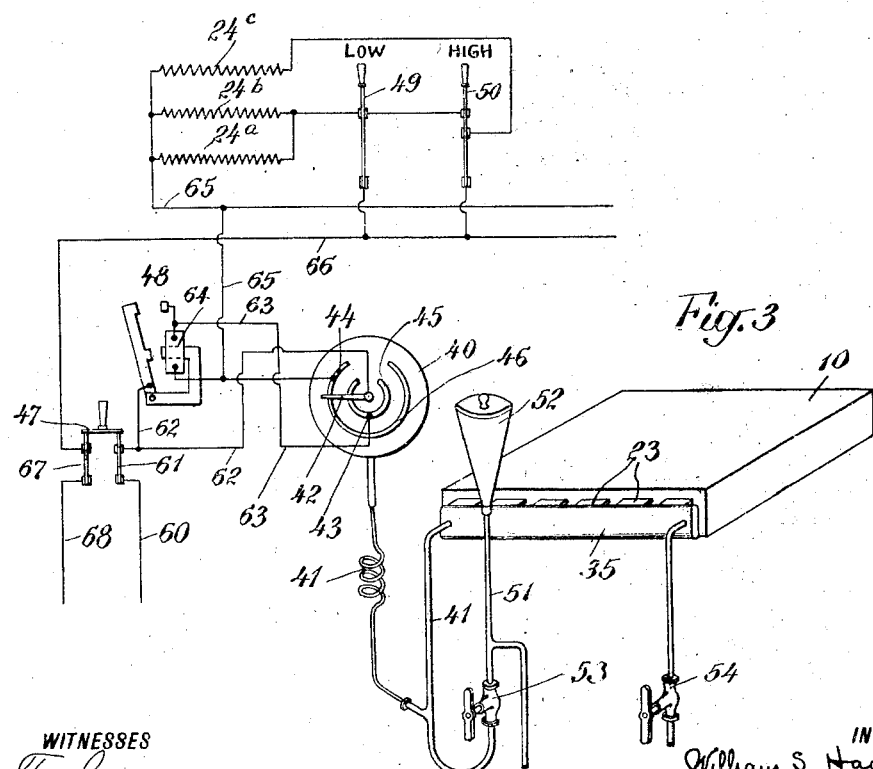
WITNESSES
F. Graves
G. R. Quimby
INVENTOR
William S. Hadaway Jr.
BY
Barbour
ATTORNEY W. S. HADAWAY, Jr.
HEATING AND REGULATING APPARATUS.
APPLICATION FILED FEB. 20, 1913.
1,097,223.
Patented May 19, 1914.
3 SHEETS—SHEET 2.
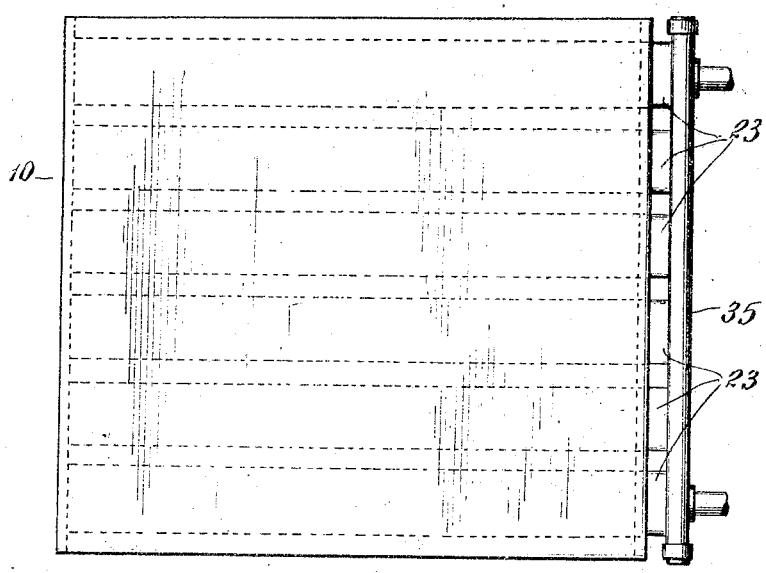
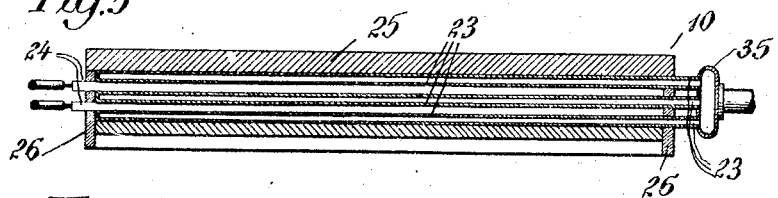
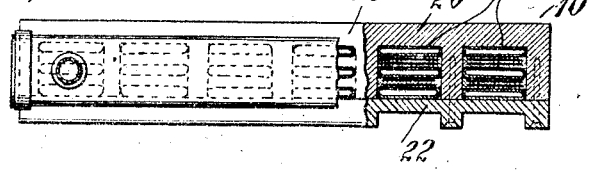
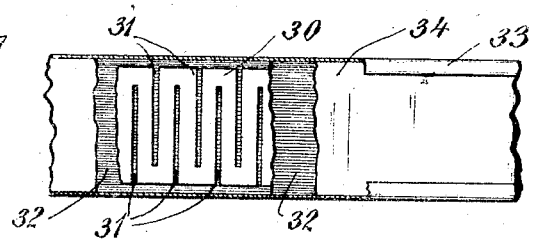
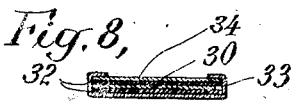
WITNESSES
F. Graves
G. R. Quimby
INVENTOR
William S. Hadaway Jr.
BY
ATTORNEY

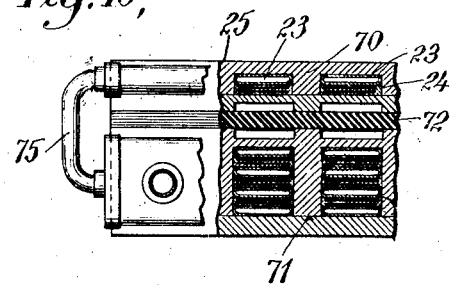
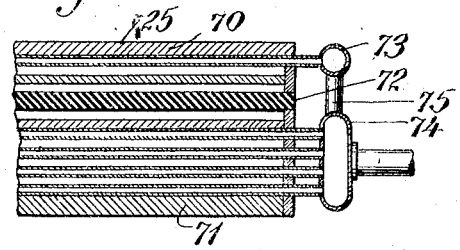
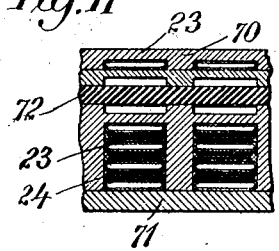
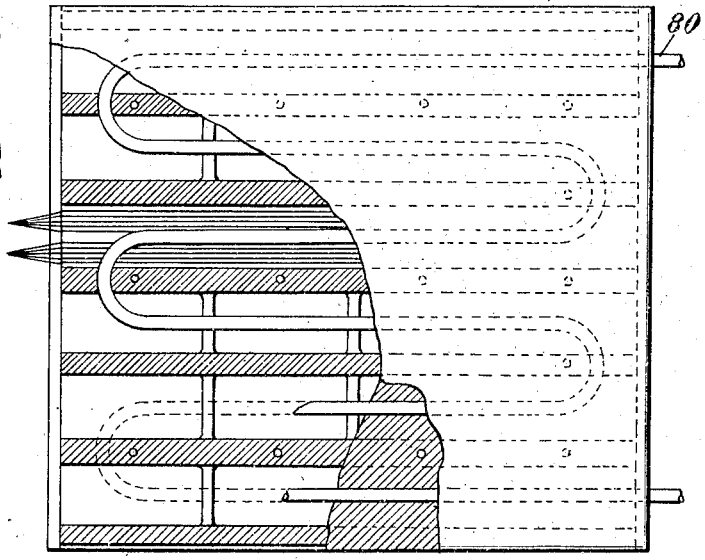
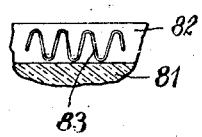
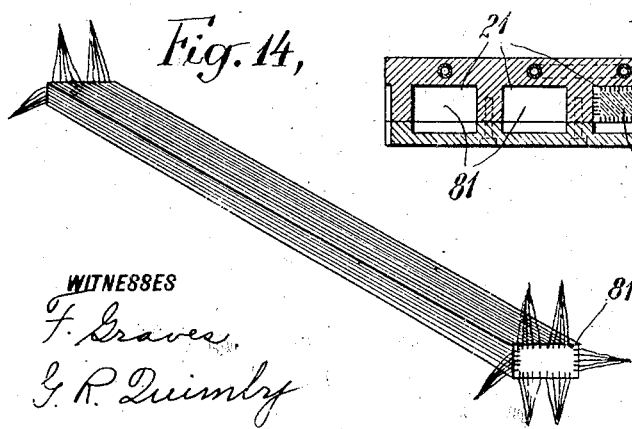
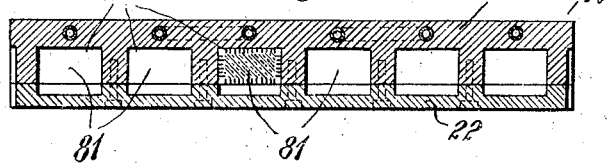

UNITED STATES PATENT OFFICE.

WILLIAM S. HADAWAY, JR., OF NEW ROCHELLE, NEW YORK.

HEATING AND REGULATING APPARATUS.

1,097,223.          Specification of Letters Patent.      Patented May 19, 1914.

Application filed February 20, 1913. Serial No. 749,595.

*To all whom it may concern:*

Be it known that I, WILLIAM S. HADAWAY, Jr., a citizen of the United States, and a resident of New Rochelle, in the county of Westchester and State of New York, have invented certain new and useful Improvements in Heating and Regulating Apparatus, of which the following is a specification, reference being had to the accompanying drawings, forming a part thereof.

My invention relates to heating and temperature regulating apparatus and it has special reference to electric heaters and temperature regulators therefor.

One object of my invention is to provide simple and effective means for generating, regulating and distributing or equalizing heat in a body and transferring heat from one body to another.

Another object of my invention is to combine, with an electric heat generator, a thermo-pressure element that shall be arranged and adapted to act in one or more of the following capacities, viz., a thermometer for indicating the integrated temperature of the body in which the heat generator is incorporated, an equalizer for distributing the heat in said body and a carrier for transferring heat from said body to another body which may or may not be provided with heat generating elements.

Other objects will be hereinafter set forth.

My invention is capable of extended application to various uses and industries. It is, for example, well adapted for use with matrix drying presses and I have for convenience chosen to illustrate and describe it in detail in this connection.

Referring to the drawings:—Figures 1 and 2 are respectively a side and a front elevation of a matrix drying press embodying my invention. A diagrammatic view of the heating and temperature regulating apparatus of my invention is shown in Fig. 3 the heater elements being separated from the bed plate of the matrix press and shown conventionally to indicate their circuit connections. Fig. 4 is a plan view of the bed plate of the matrix drying press of Figs. 1 and 2. Figs. 5 and 6 are sectional elevations, at right angles to each other, of the bed plate shown in Fig. 4. A portion of one of the heater units, which forms a part of the bed plate is shown on a larger scale in Fig. 7 with the casing and insulation broken away to disclose the heater element. Fig. 8 is a transverse sectional view of the heater unit of Fig. 7. Figs. 9 and 10 are views which correspond respectively to Figs. 5 and 6, and show a portion of a modified bed plate structure embodying my invention. Fig. 11 is a view corresponding to Fig. 10 of another modification of my invention. Fig. 12 is a partially sectional plan view and Fig. 13 is a transverse sectional view of a modified press plate structure arranged and constructed in accordance with my invention. Fig. 14 is a perspective view of one of the heater units for the press plate of Figs. 12 and 13, and Fig. 15 is a detail view on a larger scale of the same heater unit.

Like characters of reference designate corresponding parts in all the figures.

With special reference to Figs. 1 and 2 the matrix drying press here shown is of a well known type and operates in the usual manner. It comprises in general an electrically heated bed plate 10, supported on a base or frame 11, an upper press plate or platen 12 supported above and adapted to coöperate with the bed plate and suitable means such as a fluid pressure cylinder 13 in which an actuating piston or plunger 14 operates. The arrangement of parts is such that when fluid under pressure is admitted to the cylinder 13, the plunger 14, acting through suitable levers and links indicated at 15 and 16, forces the platen downward toward the bed plate in opposition to the usual releasing springs 17. A matrix or other body placed on the bed is thus subjected to pressure. The platen 12 may be adjusted relative to its support or actuated manually by a hand wheel 18. It is immaterial whether the bed plate or the platen is provided with the heater which forms a part of my invention but the bed plate is usually the stationary member of the press and it is therefore usually preferable to equip this member.

The electrically heated bed plate 10 is illustrated in detail in Figs. 5, 6, 7 and 8 to which special reference may now be had. It comprises a body 20 having a plurality of substantially parallel grooves or channels 21, and a cover member 22 and end plates 26, which are bolted or otherwise secured to the body. In each of the grooves or channels 21 is located a series of flattened tube sections 23. These sections are spaced apart by electric heater units 24, one of the flattened tubes being preferably located at the bottom of each channel nearest to a working surface 25 of the plate.

The electric heater units may be of any suitable structure but I prefer to employ flat, metalclad units, such as that shown in Figs. 7 and 8. This unit comprises a resistance ribbon 30, having transverse slots 31 cut alternately from opposite edges of the ribbon to provide a relatively long zigzag path for the electric current, insulating strips 32 placed one on each side of the ribbon and a sheet metal sheath composed of a channel 33 in which the insulated ribbon is placed and a metal strip 34 over which the edges of the channel are folded. For economy of space and efficiency in operation the flattened tubes and the heater units are approximately the same size in transverse section and fit closely into the channels 21 in the press plate.

The tube sections 23 may be closed at one end and sealed into a common chamber or header 35 as shown in Fig. 5, or two headers (not shown) one at each end of the tube sections may be employed. In fact while I have illustrated the arrangements which I consider preferable, one of my inventive ideas is to provide a distributed fluid pressure element for the purpose hereinafter explained in combination with a heater element. It is therefore evident that a single reflexed tube as shown in Fig. 12 and hereinafter described, or a number of such tubes suitably interconnected may be employed.

The interconnected tubes form a part of a closed tube system which is practically filled with water, a small amount of air being included to allow for the hydraulic expansion when heat is applied. This arrangement lends itself particularly well to an automatic regulating system such as that shown in Fig. 3. The electric circuit connections of this diagram are extremely simple and are only intended to be representative or illustrative of any suitable system such as that shown and described in detail in my co-pending application Serial Number 644,467 filed August 16, 1911.

In the diagram 40 is a pressure gage, the actuating mechanism (not shown) being of any usual construction. It is connected by a pipe 41 to the header 35 or is otherwise in communication with the closed pressure element of the press plate. The gage actuates a contact finger or pointer 42 which indicates both the pressure in the tubes and the integrated temperature of the press plate as hereinafter explained.

A pair of contacts 43 and 44 are adjustably secured to rings 45 and 46, which are suitably supported on the dial of the gage. The contacts may be adjustably arranged in any suitable manner so that one of them is engaged by the contact finger when the pressure falls to a predetermined value or rises to a predetermined value determined by the setting of the respective contacts. The system also includes a manually operated line switch 47, an electrically operated circuit closer 48 the resistance elements $24^a$, $24^b$ and $24^c$ and control switches 49 and 50. The resistance elements are located in the press plate as hereinbefore described but for convenience they are shown apart from it in the diagram of Fig. 3.

A stand pipe 51 having a funnel-shaped top 52 is connected to the tube or pipe 41 by a valve 53. Water may easily be introduced to the tube system when it is cold, by opening this valve and an escape valve 54, and pouring it into the funnel top 52 until water flows out of the escape valve. Both valves are then closed. The system may be drained by opening the valves 53 and 54.

Before describing the modifications of the press plate and heater structures, I will describe the operation of the system. Assuming that the tube system, comprising the tube sections 23, the header 35, the pipe 41 and the pressure gage 40, is practically filled with water and the valves 53 and 54 are closed, and that the system is cold so that the pressure gage pointer 42 engages the contact 43; if the control switch 49 and the line switch 47 are closed, circuit connections will be established as follows: from a line conductor 60 which may be connected to any suitable source (not shown) of electric energy, through one blade 61 of switch 47, a conductor 62, contact finger 42 of the gage, contact 43, a conductor 63, an actuating coil 64 of the circuit closer 48, a conductor 65, resistance sections $24^a$ and $24^b$, which are connected in multiple circuit relation, switch 49, a conductor 66 and switch blade 67 to an opposite line conductor 68. The circuit thus established energizes the coil 64 and actuates the circuit closer. When this is closed the circuit is completed, independently of the pointer 42 and contact 43, from conductor 62 through the circuit closer 48, coil 64 and the conductor 65, circuit being completed through the resistance sections as above traced. The electric energy supplied to the resistance sections $24^a$ and $24^b$, is translated into heat which is immediately taken up by the water tubes adjacent to the heater units. This process continues until the pressure and temperature of the water in the closed tube system are raised sufficiently to cause the pointer 42 to engage the contact 44.

The relation between the temperature and pressure of the confined liquid follows the well known law for saturated steam. This is one of the advantages of my arrangement as more fully pointed out hereinafter.

As soon as the pointer 42 engages the contact 44, a circuit is established from the conductor 62 through the pointer and contact directly to conductor 65 thereby short circuiting the actuating coil 64 of the circuit closer 48. The circuit closer is arranged in the usual manner to open automatically when its coil is deënergized and consequently the circuit, previously established through the circuit closer and the resistance units 24ª and 24ᵇ, is interrupted. The heat generating circuit is not again established until the temperature and pressure are so far reduced that the pointer again engages the contact 43. If the resistance sections 24ª and 24ᵇ are insufficient a switch 50 may be closed instead of the switch 49 thereby connecting the resistance section 24ᶜ in multiple relation with the sections 24ª and 24ᵇ.

The fluid pressure tubes by reason of the automatic circulation of fluid within them tend to automatically maintain an equal distribution of temperature throughout that portion of the pressure plate in which they are disposed. In fact they act as a means for conveying heat from one portion of the heated body to another and obviously they may be employed for conveying heat from one body to another, the latter arrangement being more fully disclosed in connection with the modification illustrated in Figs. 9, 10 and 11.

The arrangement and distribution of the tubes relative to the pressure plate is such that the gage pointer is a true indication not only of the pressure existing in the tube system but also of the integrated temperature of the body. It is obvious that no matter how carefully the electric heater units are distributed, some parts of the body will be hotter than others. It is extremely difficult and expensive to proportion the resistance units to effect anything like an even distribution of heat over the working surface of a body such as the bed plate 10. This becomes entirely unnecessary and the resistance units may be equally or otherwise conveniently distributed if the fluid distributing means of my invention is utilized. In providing a heater for matrix drying presses, it is particularly important to obtain a well distributed high temperature on the working surface in order that the work may be done most efficiently and expeditiously. If electric heating units are utilized alone for this work it is extremely difficult to avoid sudden fluctuations in temperature and there is also danger of overheating the matrix after it has dried out. All of these disadvantages are overcome by the use of my present invention and attention is specially directed to the fact that the system is a particularly simple one, the parts of which are well known and well understood by intelligent operators and in fact the relation between the temperature and pressure follows, as already pointed out, the law for saturated steam and consequently the gage may be easily calibrated by reference to an ordinary steam table.

In order to avoid all possibility of damaging a matrix by overheating, the arrangement shown in Figs. 9 and 10 may be utilized. As here shown the bed plate of the matrix press is divided into an upper section 70, 25 being the working surface and a lower section 71 which is similar in construction to the entire bed plate shown in Figs. 5 and 6. The upper section may either be provided with a comparatively small proportion of the whole number of electric heater units as shown in Figs. 9 and 10 or it may have no heater units at all, the lower section being either provided with a relatively large number or all of the heater units as shown in Fig. 11. The two sections are separated from each other by a plate 72 of heat insulation and both of the sections are provided with tube sections 23. These sections may be all connected to a common header but I prefer to connect those of the upper section to one header 73 and those of the lower section to another header 74, the two headers being inter-connected by some suitable means, such for example as the removable pipe connectors 75. In this way the two sections may be assembled independently and utilized either singly or together.

While the water contained in the tube system escapes by leakage very slowly, if at all, and while it is a very simple and easy matter to replenish the supply, there is of course a possibility that the water may be exhausted through inadvertence or carelessness on the part of the operator. If the arrangement shown in Figs. 9 and 10 or that shown in Fig. 11 is employed there is practically no possibility of overheating the matrix or whatever is in contact with the working surface even if the water is exhausted, because a large proportion of the heat generated is, under these abnormal conditions, confined to the heater section which is remote from the working surface and is spaced from it by heat insulation. It is obviously extremely important to avoid injuring or destroying a matrix such as is used in producing a daily news paper and my invention is for various reasons, well adapted for high grade and difficult work of this character.

In Figs. 12 and 13, I have illustrated another modified structure of heater which is adapted to be used as a press plate for a matrix drier. The body of the plate is similar to that shown in Figs. 4, 5 and 6 except that a reflexed pipe or tube 80 is cast into or otherwise made substantially integral, with the body of the plate near its working surface. This reflexed tube corresponds to the series of tube sections 23 of the other form.

The heater units are disposed in the channels 21 and as shown in detail in Figs. 14 and 15 each of them comprises a bar 81 of soap stone or other heat absorbing and electric insulating material having a substantially rectangular section and provided with a plurality of longitudinal slots or saw cuts 82 in which reflexed resistance wire 83 is disposed.

After the resistance wire is in place, the slots may be filled with suitable insulating cement if desired.

Various modifications will suggest themselves to those skilled in the art, and I intend that only such limitations be imposed, as are indicated in the appended claims.

On August 16th, 1911, I filed an application for Letters Patent Serial No. 644,467 which is co-pending with this application. In my present application, I have shown and described the same subject matter shown in the earlier application just referred to. In addition to this matter however, I have included several specific modifications of the same invention. The broad claims presented in the earlier application have been included in this application and have been divided out of the earlier application which is now limited to the specific thermometer circuit breaker system contained therein and held to constitute a separate invention. This application is therefore a continuation in part of the aforesaid application Serial No. 644,467.

What I claim is:

1. In combination, a heat generator, a substantially solid body to be heated thereby, and a normally closed fluid containing thermo-pressure element arranged to equalize the temperature in the heated portions of the body.

2. In combination, a heat generator, a substantially solid body to be heated thereby, and a normally closed fluid containing thermo-pressure element arranged to equalize the temperature in the heated portion of the body and to indicate an integrated temperature of said heated portion.

3. In combination, a heated substantially solid body, and a thermometer associated therewith to indicate an integrated temperature of the heated portion of said body.

4. In combination, a heated body, a thermometer arranged and extending to be influenced by the heated portion of said body at a plurality of different points therein, whereby it is adapted to indicate an integrated temperature of said heated portion.

5. In combination, a substantially solid heated body, a normally closed thermometer containing a liquid adapted when heated to vaporize to create a pressure varying with the heat, said thermometer being subjected to the heat of said body at different points thereby causing the pressure therein to indicate the mean temperature of the heated portion of said body as a whole.

6. In combination, a matrix bed, a plurality of electric heating units arranged therein, and a normally closed thermo-pressure passage arranged therein adjacent to the heater units, said passage being distributed through the bed and containing a liquid vaporized by the heat of said bed to create a pressure indicating the mean temperature of the bed.

7. In combination, a heat generator, a substantially solid body to be heated thereby, and a normally closed thermo-pressure element associated with the heat generator and extending into the body to be heated, to transfer heat from the generator to the body and to equalize the temperature therein.

8. A heater comprising a substantially solid body, and a normally closed thermo-pressure element and electric heat generating units disposed adjacent to each other therein.

9. In combination, a substantially solid heated body, an electric heater therefor, a normally closed thermo-pressure element partially disposed in said body distributed therethrough, and pressure responsive means connected to said thermo-pressure element for governing the energization of the electric heater.

10. In combination, a heated body, an electric heater therefor, a normally closed thermo-pressure element partially disposed in said body and distributed therethrough to indicate the integrated temperature of the body and to equalize the heat therein, and pressure responsive means connected to said thermo-pressure element for governing the energization of the electric heater.

11. A heater comprising a substantially solid body having a normally closed thermo-pressure passage therein, electric heat generating means for the body and automatic means dependent upon the pressure in said thermo-pressure passage for regulating the heat generated.

12. In combination, a heated body, a thermometer tube embedded in and extending in a tortuous path through said body whereby it is arranged to indicate the mean temperature thereof.

13. A heater comprising a substantially solid body having a normally closed thermo-pressure passage therein, electric heat generating means for the body and automatic means dependent upon the pressure in said thermo-pressure passage for regulating the heat generated and for indicating the mean temperature of the body.

14. In combination, a matrix bed, a plurality of electrical heating units arranged therein, and a thermometer tube embedded in said matrix bed between the active surface thereof and said heating units, said tube being reflexed throughout substantially the whole area of the matrix bed and containing a liquid vaporized by the heat of said bed to create a pressure indicating the mean temperature of said bed.

15. An electric heater comprising a solid body of heat conducting material having a working surface, a normally closed fluid containing tube disposed in the body, near said working surface and an electric heater element disposed in the body in engagement with said fluid containing tube.

16. A heating appliance comprising a heat generator, a substantially solid body adapted to be heated directly thereby, and means for transferring heat from hotter to cooler portions of said body.

In witness whereof, I have hereunto set my hand this 17 day of February in the year 1913.

WILLIAM S. HADAWAY, Jr.

Witnesses:
R. J. DEARBORN,
F. GRAVES.